United States Patent
Mathy, Jr. et al.

(10) Patent No.: US 10,351,377 B2
(45) Date of Patent: Jul. 16, 2019

(54) ULTRASONIC ROLL TAIL CLOSURE OF NON-WOVEN WEB MATERIAL METHOD AND APPARATUS

(71) Applicant: ELSNER ENGINEERING WORKS, INC., Hanover, PA (US)

(72) Inventors: John Madden Mathy, Jr., Stewartstown, PA (US); Michael Carl Chase, Dover, PA (US); Zakari Hinton Snell, York, PA (US); John J. Markle, II, New Oxford, PA (US)

(*) Notice: Subject to any disclaimer, the term of this patent is extended or adjusted under 35 U.S.C. 154(b) by 338 days.

(21) Appl. No.: 15/213,715

(22) Filed: Jul. 19, 2016

(65) Prior Publication Data
US 2017/0036875 A1    Feb. 9, 2017

Related U.S. Application Data

(60) Provisional application No. 62/200,440, filed on Aug. 3, 2015.

(51) Int. Cl.
*B32B 37/00* (2006.01)
*B65H 19/29* (2006.01)
(Continued)

(52) U.S. Cl.
CPC ............ *B65H 19/29* (2013.01); *B29C 65/08* (2013.01); *B29C 65/081* (2013.01); *B29C 66/1122* (2013.01); *B29C 66/344* (2013.01); *B29C 66/348* (2013.01); *B29C 66/4322* (2013.01); *B29C 66/7294* (2013.01); *B29C 66/8221* (2013.01); *B29C 66/8324* (2013.01); *B29C 66/9221* (2013.01); *B29C 66/9241* (2013.01); *B29C 66/961* (2013.01); *B29C 66/81469* (2013.01); *B65H 2301/41442* (2013.01);
(Continued)

(58) Field of Classification Search
CPC ... B29C 65/08; B29C 65/081; B29C 66/1122; B29C 66/344; B29C 66/348; B29C 66/4322; B29C 66/7294; B29C 66/8221; B29C 66/8324; B29C 66/9221; B29C 66/9241
USPC ........................................................ 156/580.1
See application file for complete search history.

(56) References Cited

U.S. PATENT DOCUMENTS 2,394,822 A    2/1946 Telplitz
3,134,980 A    5/1964 Alexander
(Continued)

FOREIGN PATENT DOCUMENTS

DE    102004311654 A1    9/2004
EP    1627840 A1    2/2006
WO    2009111809 A1    9/2009

*Primary Examiner* — James D Sells
(74) *Attorney, Agent, or Firm* — Patent Law Associates (57) ABSTRACT

An apparatus for securing the tail end of a spirally wound roll of nonwoven, polymer-based material to the roll to preclude unintended unwinding of the roll, the apparatus comprising a winding assembly for forming about a winding axis a spirally wound roll with a tail end, a fixture for a roll tacking assembly with an ultrasonic tool oscillating on an oscillating axis, and a fixture for moving the tool into momentary tangential contact with an outermost winding layer of the roll in a manner that orients the oscillating axis orthogonally to the winding axis. The apparatus implements a method of locating the tail end of the spirally wound roll and orienting the tail end in relation to the securing tool.

8 Claims, 4 Drawing Sheets

(51) Int. Cl.
  *B29C 65/08*      (2006.01)
  *B29C 65/00*      (2006.01)
(52) U.S. Cl.
  CPC ............ *B65H 2301/414443* (2013.01); *B65H 2515/50* (2013.01); *B65H 2701/1924* (2013.01)

(56) References Cited

U.S. PATENT DOCUMENTS

| | | |
|---|---|---|
| 3,485,690 A   | 12/1969 | Kozai |
| 3,592,340 A   | 7/1971  | Hoey |
| 3,874,963 A   | 4/1975  | Barger |
| 3,935,057 A   | 1/1976  | Gray |
| 4,292,114 A   | 9/1981  | Engmann et al. |
| 5,207,854 A * | 5/1993  | Becking ................. B29C 65/08 156/157 |
| 6,287,403 B1  | 9/2001  | Couillard et al. |
| 6,620,291 B1  | 9/2003  | Gartland et al. |
| 7,182,827 B2  | 2/2007  | Davis et al. |
| 7,780,805 B2  | 8/2010  | Darcy, III et al. |
| 7,846,286 B2  | 12/2010 | Gelli |
| 8,002,927 B2  | 8/2011  | Byrne |
| 2005/0016664 A1 | 1/2005 | Davis et al. |
| 2014/0311654 A1 | 10/2014 | Hansen et al. |

\* cited by examiner

ULTRASONIC ROLL TAIL CLOSURE OF NON-WOVEN WEB MATERIAL METHOD AND APPARATUS

CROSS-REFERENCE TO RELATED APPLICATIONS

This application claims the benefit of priority of U.S. Provisional Application No. 62/200,440, filed Aug. 3, 2015.

BACKGROUND OF THE INVENTION

The present invention relates generally to method and apparatus for securing the tail of a convolutely wound web material, and, more particularly to a method and apparatus for securing the tail of wound webs of nonwoven materials that contain fibers bonded together by chemical, mechanical, heat, or solvent treatment material using ultrasonic means.

In the production of rolled web products for consumers, a rewinder or converter unwinds a large wound roll of web material, subjects the web material to desired conversions, such width slitting or perforations, and then rewinds the web into consumer sized, convolutedly wound rolls. The rewound rolls are typically removed from the rewinder and packaged using a separate machine and process. The rewound rolls have a tendency to unwind during this transition which complicates subsequent packaging operations. To prevent unintended unwinding of the rolls, it is common to secure the tail of the roll to the underlying layers of the web material.

As would be known to those of skill in the art, there are a number of well-known manners in which the tail, or end, of a convolutely wound web product may be secured or sealed to underlying layers in the roll. Common methods vary depending upon the web material and include gluing, moistening, mechanical deformation to join adjacent layers in the roll. In most commercially available embodiments, the tail securing method requires manipulation of the wound roll to apply the joining means sufficiently close to the tail to minimize the length of the unsecured end of the tail. Product packaging in which the product is accessed by unwinding the innermost layers first generally require only that the tail be secured to minimize problem potential during subsequent packaging operations, typically insertion of the roll into a container. Products that are externally unwound usually require a predetermined length of unsecured tail to provide a grasping point for the user to begin unwinding the roll.

Many products, including disposable wipes, are under increasing scrutiny regarding chemicals used in manufacture and production. Adhesives conventionally used to secure the tails in nonwoven polymer-based web that is typically used in disposable wipes are increasingly disfavored. Known ultrasonic welding methods are plagued by inconsistent performance and a tendency to bond numerous layers of the convoluted roll, leading to a high degree of waste as the packaged roll nears its end. It would be advantageous to provide a method and apparatus for securing the tail of a convolutely wound roll of nonwoven polymer-based web material using ultrasonic means which minimizes the layers of material secured in the bonding process while securing the tail sufficiently for subsequent packaging operations.

SUMMARY OF THE INVENTION

The present invention overcomes known limitations with ultrasonic bonding of polymer-based nonwoven materials in a convoluted roll by orienting an ultrasonic converter from the well-known radial orientation to an orientation that is tangential to the roll. An ultrasonic converter having a tool oscillating along a linear axis is provided with a grip for frictionally engaging the outer layer of a web in a convoluted roll. The grip is positioned radially in relation to the roll to produce sufficient inward pressure on the outer layer for the grip to cause the outer layer to oscillate therewith, but limit the number of inwardly adjacent layers of the winding that are similarly engaged. Friction generated between the oscillating outer layer and the relatively stationary inwardly adjacent layer creates heat to bind the outer layer and the inwardly adjacent layer. By limiting the inward radial pressure to that sufficient to engage the outer layer of the wound web with the grip, the depth of bond between adjacent layers of the web is minimized and ideally limited to the outer two or three layers.

A machine for implementing the tangential ultrasonic method of securing the tail of a convolutely wound roll of nonwoven polymer-based web material includes a carrier for a bulk roll of web material, a primary feed path for linearly conveying the web to a winding apparatus as it is unwound from the bulk roll, and a winding apparatus for receiving the web from the feed path, winding the web into a plurality of generally smaller, convolutely wound rolls, and delivering the rewound rolls to a packaging apparatus. The packaging apparatus may be incorporated in the machine or provided in a separate packaging machine. The primary web feed path includes belts and rolls that frictionally engage the web to manage the velocity and direction of web movement along the path. Additional apparatus may be positioned along the web feed path to perform conversions on the passing web such as perforating, slicing, slitting, folding, and/or marking. The winding apparatus may include a plurality of winding spindles, each being aligned transverse to the feed path, which are individually engaged with the web and around which the rewound rolls are formed. The spindles are capable of selective rotation. Rotational speed of the spindles is controlled so that the tangential velocity of the spindle matches the speed of the web as it is directed into contact with the spindle or the outer circumference of the roll thereon. When a desired quantity of web material is wound on the active winding spindle, the winding apparatus moves the active spindle from interface with the web while moving a second winding spindle into engagement with the web. Simultaneous with the spindle transition, a severing apparatus transversely severs the web allowing the continuously moving web to be wound on the now-active spindle while the completed wound roll is readied for subsequent operations by slowing and/or stopping its rotation. Among the operations is the securing of the tail to prevent unwinding. An ultrasonic welding apparatus is provided, the apparatus including a tool that is brought into momentary tangential contact with a stationary wound roll at a position proximate to the tail. A grip on the tool engages the outer web layer causing it to oscillate in the tangential direction therewith. Friction between the outer web layer and inwardly adjacent web layers bonds the adjacent layers thereby securing the tail to the roll.

Movement of the ultrasonic apparatus may be controlled by numerous known means including mechanical, pneumatic, hydraulic, or electric servo. The apparatus is normally positioned adjacent to a location at which the winding spindle will be positioned once completed rolls are formed and active winding is transferred to a second spindle. The wound roll spindle may be rotating or rotation may be stopped. The spindle may be indexed so that the ultrasonic tool can be brought into contact with the wound roll within a predetermined rotational displacement of the tail location. The mechanism may include provisions for managing the inward pressure applied between the tool and the periphery of the wound roll, oscillation frequency of the tool, and/or duration of tool contact with the wound roll. Multiple ultrasonic apparatus may be used depending upon the number of rolls wound on a single spindle. Such apparatus are typically controlled in parallel.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "forward" or "rearward" are used as a matter of convenience and are determined by the viewing in the direction of material movement in a winding/rewinding process. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
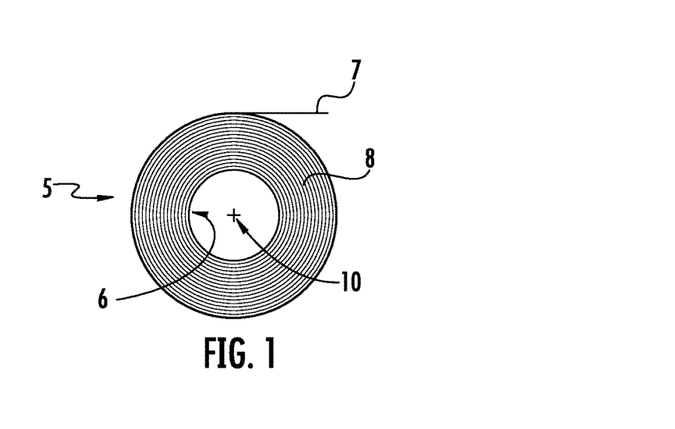
FIG. 1 shows an end view of a conventional convolutely wound roll of the type on which the present invention is useful.

In FIG. 1 there is shown a spirally wound roll 5 of a web material 8 wound generally about a roll axis 10. The roll includes a leading end 6 and a trailing end or tail 7 spanned by a continuous length of the web material 5. The continuous length of web material may include perforations or the like that allow the web in the roll to be easily divided into a plurality of shorter length "sheets" for use while allowing for rolling of the entire continuous length in a single rolling process. The roll 5 may be formed by spirally winding the leading end and a length of the web 8 into an initial spiral winding around a core or similar initial roll stiffener. Alternatively, the roll 5 may be formed by directing the leading end 6 to a mandrel or spindle around which the web material 8 is wound for a number of 360° wraps of the web to create the roll 5 of a desired quantity of web material. Once a desired quantity of web is wound into the roll, the web is severed creating a tail 7 which is incorporated into the roll. The tail 7 may optionally be secured to the roll to prevent inadvertent unwinding of the roll during handling following the winding operation.

Figure 2:
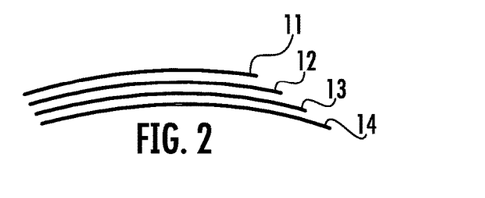
FIG. 2 is a detail view of the end of a convolutely wound roll illustrating the convolute layers of the web material forming the roll.

Referring to FIG. 2, the outer periphery of the roll 5 is shown comprising a plurality of layers of the convolutely wound web material. These include the outermost layer 11 and a plurality of inwardly adjacent layers including, a first inward layer 12, a second inward layer 13, and a third inward layer 14. Additional inwardly disposed layers may be included in the roll up to the total number of turns in the winding.

Securing the tail 7 to the roll 5 may be accomplished in a variety of manners depending upon the web material, acceptable levels of web involved in the tail closure (wastage). Known methods include the use of adhesives or glues, water or fluid adhesion, and chemical or thermal bonding. Some methods are non-location specific, suitable for implementation as the roll continues rotate. These methods typically result in full or partial circumferential bonding area between adjacent layers and may involve more than the outermost two layers if the process is active for more than a complete revolution of the roll. Other methods require ceasing rotation of the roll prior to activating the securing means. The roll may or may not be indexed to bring the tail into proximity with the bonding area. Ideally, such means involve bonding the outermost layer 11 to the first inward layer 12. In practice, multiple layers of the wound roll are usually involved in the tail closure bonding as a balance between bonding strength and wastage is sought.

The present invention is based on an ultrasonic method of securing the tail of a wound web of nonwoven polymer-based material. The ultrasonic method uses high frequency, low amplitude vibrations to generate heat through friction between adjacent layers sufficient to weld the adjacent layers together. In contrast to a normal ultrasonic welding process in which the layers of thermoplastic material to be welded are sandwiched between an ultrasonically oscillating horn and a stationary anvil, the present process oscillates the outermost winding layer in relation to at least one inwardly adjacent winding layer, generating frictional heat to create the weld. By managing pressure and orienting relative movement between the outermost winding layers to a tangential plane, the penetrating depth of the ultrasonic energy is limited to the outermost winding layers which limits waste in a final product.

Figure 3:
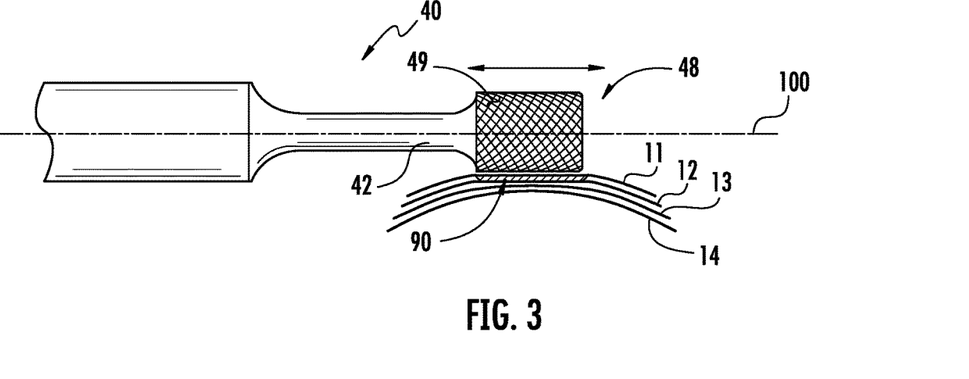
FIG. 3 is a view of the detail of FIG. 2 showing the positioning of an ultrasonic tool for binding the tail to the roll.

One embodiment is illustrated in FIG. 3, wherein an ultrasonic welding apparatus 40 having a converter 42 for receiving an input signal and causing a tool 48 to oscillate in response thereto. Oscillation occurs along an oscillation axis 100. A variable power supply may be used to generate the input signal thereby allowing for adjustment of the oscillation frequency. Typical oscillation frequencies range from 10 kHz to 40 kHz. The oscillation axis 100 is oriented to bring the tool 48 into tangential contact with the roll 5 and may be oriented orthogonally to the roll axis 10 or angled thereto so long as the oscillation axis 100 is oriented to bring the tool 48 into tangential contact with the outermost winding layer. Tool 48 includes a high-friction surface 49 configured to grip the outermost layer of 11 the roll and cause the outermost layer to oscillate therewith. The tool 48 is pressed radially inwardly against the roll, increasing pressure between the oscillating outermost layer 11 and the first inward layer 12. Inward grip pressure is modulated to manage the friction between adjacent layers so that the outermost layer 11 oscillates with the tool/grip while the first inward later 12 remains generally stationary. Relative movement between the adjacent layers generates heat though friction and thermally bonds the layers in an area approximate to the grip contact area. Increased inward pressure engages additional inwardly adjacent layers of the roll into the weld zone 90, potentially incorporating them into the bond, and allowing the bond strength and number of layers involved to be adjusted for varying material properties and end user requirements.

The tangential orientation of the ultrasonic tool 48 and oscillation axis 100 to the wound roll 5 limits the depth of influence of the frictional energy imparted to the web material to typically the outer two or three layers of the roll. Conventional ultrasonic binding methods used on nonwoven polymer-based webs generally orient the oscillation axis radially to the wound roll. Radial orientation of the oscillation creates a conical zone of influence that can extend inwardly through several layers of the web, causing the innermost layers to be weld first, which increases the length of web material that may become unusable. Depending on the web substrate properties, increased time and/or pressure may be required to ensure the outermost layer 11 is secured in the bond which further increases the depth of bonding penetration and thus wastage in the roll.

Figure 4:
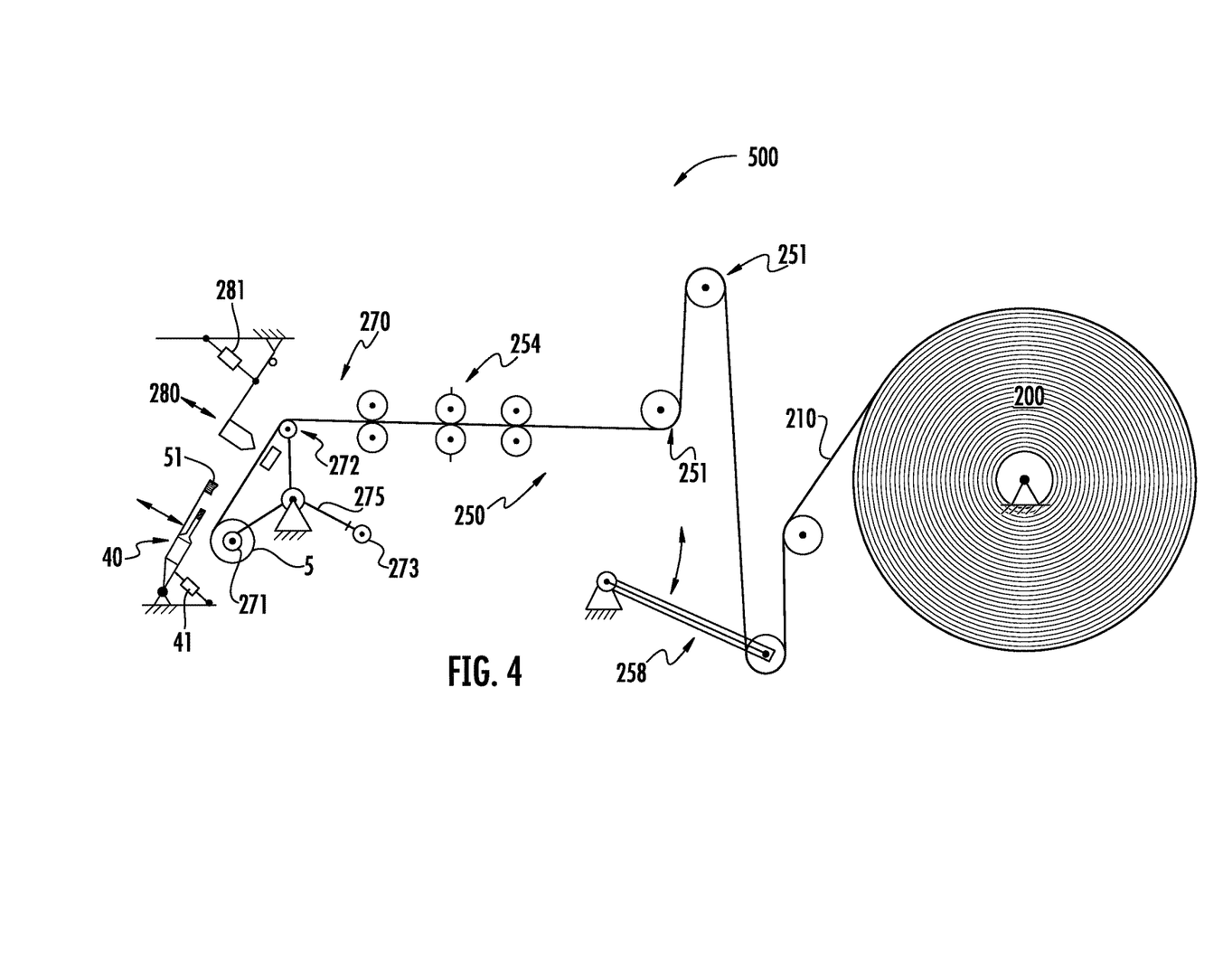
FIG. 4 shows an apparatus for implementing the ultrasonic tail closure method.
Figure 5:
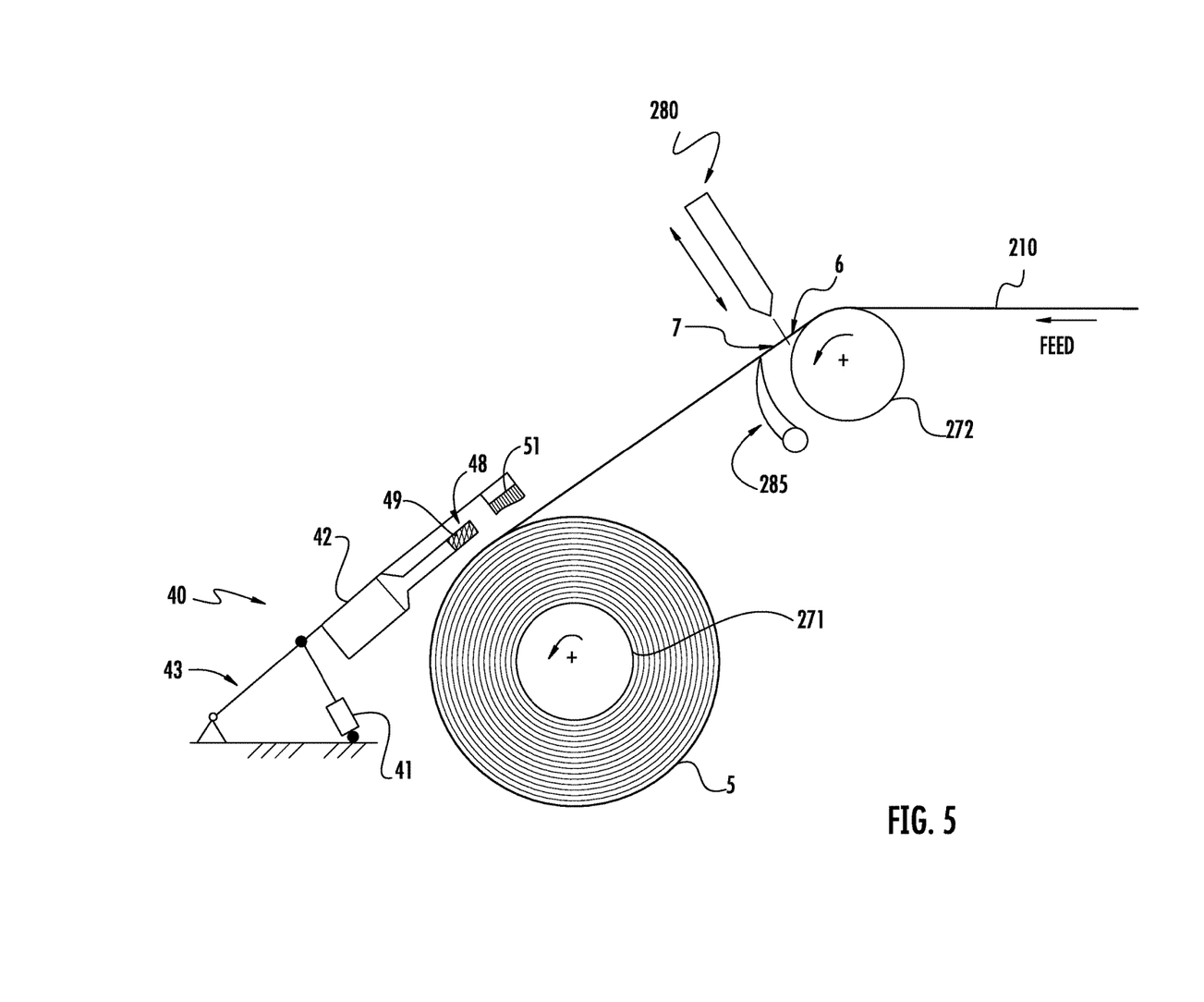
FIG. 5 is a detailed view of FIG. 4.
Figure 6:
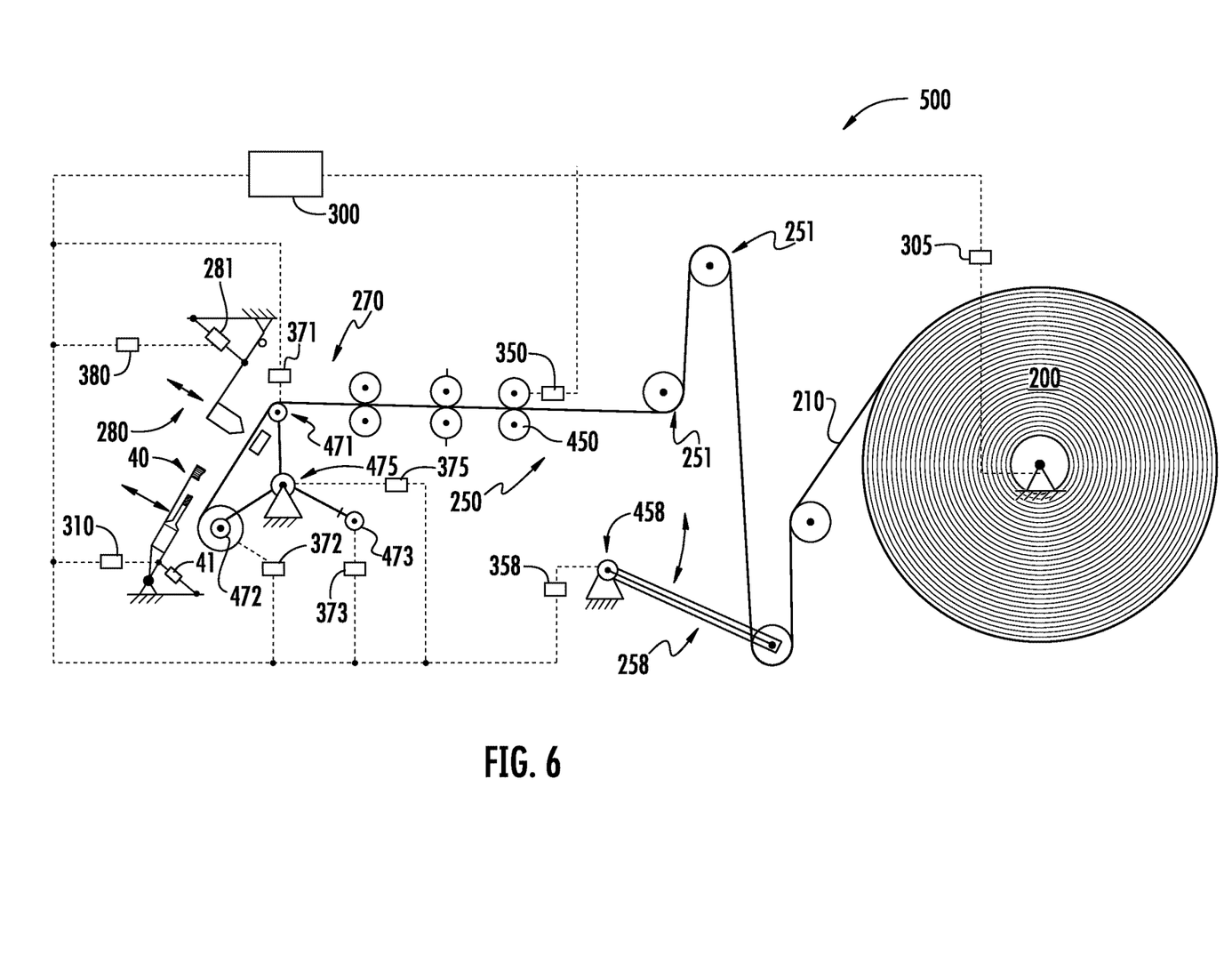
FIG. 6 shows a diagram of a control system for the apparatus of FIG. 4.

FIGS. 4-6 present a simplified illustration of a roll winding apparatus 500 for implementing a process for securing the tail of a convolutely wound roll of nonwoven polymer-based material using the ultrasonic welding apparatus 40 described above. Web material 210 is directed from a bulk web supply 200 along a feed path 250 toward a winding station 270. The bulk web supply has a width that is at least as wide as the desired final packaged roll width and preferably suitably wide to allow the winding of multiple rolls in parallel by longitudinally slitting the web as it approaches the winding station. The length of the bulk web supply is significantly longer than the desired packaged roll length thereby allowing the production of numerous final rolls from a single bulk roll of web material. A bulk web sensor 305 may be provided to monitor the quantity of bulk material on the bulk roll to enable the control system 300 to initial alerts when the bulk roll is near-exhausted.

The feed path 250 may include belts, rollers 251, and other known means for conveying the web along a path at a desired direction(s) and velocity. Feed path speed sensors 350 and drivers 450 monitored and managed by the control system 300 allow control of the web speed on the path feed 250 being fed into the winding station 270. Web velocities of 400 to 700 feet per minute are known.

One or more web processing apparatus 254 may be provided along the feed path 250 to alter the web as it passes. Common processes include transversely perforating the web to create defined-length portions that may be easily detached from the roll in the final package and longitudinally slitting the web to achieve a plurality of parallel webs, called lanes, having a desired roll length. A take-up apparatus 258 having a take-up position sensor 358 and a take-up actuator 458 is preferably provided to accommodate variations in the web feed velocity without disrupting the web velocity at the tangential interface with the bulk web supply 200.

One exemplar winding station 270 comprises a plurality of winding spindles 271, 272, 273, mounted on a rotatable turret 275. The winding spindles 271, 272, 273 may be independently rotatable by respective spindle drivers 471, 472, 473 and monitored by spindle sensors 371, 372, 373. The drivers 471, 472 and sensors 371, 372, 373 are operably connected to the control system 300. Alternatively, the spindle drivers may be provided to rotate the spindles only in certain turret positions which reduces the number of drivers required since the spindles are not required to be rotated at all turret positions. Similarly, the turret 275 includes a turret position sensor 375 and a turret actuator 475 operably connected to the control system 300 for managing the position and operation of the turret 275. The winding spindles 271, 272, 273 serve as mandrels for the winding the web material 210. The arrangement of the winding spindles on the turret 275 enables one spindle to be used for winding the incoming web from the feed path while a second spindle, having wound rolls thereon, is manipulated to remove the wound rolls for additional steps in the process, including securing the tail to the roll.

The winding station 270 further includes a severing apparatus 280 which is selectively movable by a severing actuator 281 into contact with the web 210 to sever the entire width of the web (all lanes) and allow the web winding to be transferred to another winding spindle. A severing position sensor 380 is provided and operably connected to the control system 300 to enable the control system to manage and integrate the web severing step into the roll winding process. Severing the web creates a tail 7 of the upstream roll (wound on first spindle 271) and a leading end of the downstream roll (wound on spindle 272). The severing apparatus may comprise a knife and anvil configured to cut the web or a movable anvil or separating roller configured to break the web at a previously applied perforation. Roll starter guides 285, managed by the control system, or the like are provided to direct the leading end 6 of the web into contact with the active spindle (272 in the illustrated example) to commence winding of a subsequent roll.

Once the web is severed, the first spindle 271 continues to rotate to wind the tail 7 into the upstream roll 5. Spindle rotation is then preferably suspended and the spindle oriented to position the tail 5 proximate to the tangential contact point of the ultrasonic welding apparatus 40 and slightly downstream thereof to minimize the length of unsecured tail on the roll. The control system managing spindle rotation and movement of the severing apparatus allows the roll to be oriented so that the tail is positioned at the desired location for securing to the roll, typically allowing for an unsecured tail length of two inches or less if so required. In the absence of criteria, the ultrasonic welding may occur at any point around the outer circumference of the roll assuring that no more than a single circumference of web will remain free from the roll.

The welding apparatus comprises a movable tacking fixture 43 which supports the ultrasonic converter 42 with the tool 48 in a manner permits the proximity of the tool 48 to the outer periphery of the wound roll to be varied by an actuator 41. A roll wiping device 51 may also be attached to the fixture 43 and positioned to contact the outer periphery of the roll windings prior to contact by the tool 48 to assure that the roll is firmly wound before the tail is secured. Once the spindle and roll are stationary, the tool 48 is moved into contact with the outer layer 11 of the roll 5 with a predetermined pressure to cause bonding of the adjacent layers, preferably the outermost two layers as previously described.

When multiple web lanes are created by slitting, multiple converters 42, tools 48, and wiping devices are provided on the fixture, the number of each being equal to the number of web lanes formed by the slitting operation. The objective is to individually secure the tail of each roll that is wound on the spindle, even when there are several rolls being wound in parallel.

Movement of the ultrasonic welding apparatus 40 is preferably managed by the control system 300 and may further include one or more sensors 310 in a control feedback arrangement for monitoring the contact pressure between the tool and the outer layer as well and sequencing tool contact with the outer layer and the rotational orientation of the spindle and tail. The ultrasonic converter 42 may be momentarily energized when the grip is moved into contact with the roll outer layer, for predetermined periods as the roll winding transitions occur and remain de-energized as the roll winding occurs, or continuously energized during roll winding operation.

Operation of the roll winding apparatus 500 is managed by the control system 300. The control system 300 is programmed to receive input signals from the plurality of sensors provided on the apparatus, user inputs defining certain fixed criteria such as web material characteristics, desired wound roll size, and/or proximity of the tail tack/weld to the tail end, and then, based on algorithms initiate output signals to the various actuators provided on the apparatus to and may further include one or more sensors in a control feedback arrangement for monitoring the contact pressure between the tool and the outer layer as well and sequencing tool contact with the outer layer and the rotational orientation of the spindle and tail.

The method for forming the wound rolls and securing the tail to completed rolls comprises the following steps. The web is directed to the first spindle 271 and the web is then fed along the feed path 250 as the first spindle 271 is rotated. The turret 270 is oriented so that the first spindle 271 is in what is referred to as the winding position. The control system 300 monitors spindle sensor 371 and the web feed sensor 310 so that the length of web material on the spindle is known.

As the amount of web material on the first spindle 271 nears the desired amount, the turret 270 is actuated to reposition the first spindle 271 to a second position, called the index position, and the second spindle 272 is positioned in the winding position. The position of the first spindle 271 is monitored as there may be disruptions in the spindle position sensing capability during movement of the turret 270. The tacking fixture 43 is moved to bring the roll wiping device 51 into contact with the outer periphery of the wound roll, referred to as the wiping position. The severing apparatus 280 is actuated to break the web 210. As the web is broken, the roll starter guides 285 are positioned to direct the newly formed leading end onto the second spindle 272 to commence winding of a second roll. The timing of the severing apparatus operation, spatial separation between the severing apparatus 280 and the first spindle 271, the rotational speed of the first spindle, and the size of the wound roll may be used to calculate the position of the tail as it is incorporated into the first roll. Alternatively, other sensors such as optical or contacting may be used to sense the position of the tail on the first roll.

As the second roll is being formed on the second spindle 272, rotation of the first spindle ceases and the first spindle is positioned so that the tail is positioned near to the point on the wound roll to be contacted by the tool 48. The tool 48 is moved into contact with the outermost layer of the roll (referred to as the tacking position of the welding apparatus) to secure the tail to the roll. Once the tacking operation has occurred, the tacking fixture 43 is repositioned to a ready position at which neither the tool 48 nor the wiping device 51 is in contact with the roll. This position allows movement of the roll by turret repositioning without contact with the welding apparatus 40.

It may be desirable to bond the roll tail in multiple locations around the periphery. In such cases the rolls would be rotated, momentarily paused in position, and the ultrasonic welding apparatus redeployed to apply the desired number of bonding point around the roll periphery.

As the second roll nears the desired quantity of web on the second spindle 272, the turret 270 is again repositioned to move the second spindle from the winding position to the tacking position. The third spindle 273 moves into the winding position. The web breaking and tacking process is as described for the first wound roll and rolling of the third roll commences. During the turret movement, the first spindle is moved to a third position, called the stripping position where the formed and tacked rolls are removed from the first spindle 271 and discharged from the roll winding apparatus 500. The spindle may or may not be rotated while in the stripping position which allows a driver for this spindle position to be eliminated. The completed and tacked rolls may then be directed to other operations, typically packaging.

The cycle continues in which winding occurs at one spindle location, indexing and roll tail tacking occurs at a second spindle location, and spindle stripping occurs at a third spindle location. Each spindle location is determined by the configuration of the turret; turret rotation advances the spindles through the process. Additional spindles may be provided to incorporate additional roll operations into the process between roll winding and discharge for packaging. Three spindles are preferred for efficiency.

Multiple welding apparatus 40 may be required to operate in parallel, spaced apart along an axis parallel to the winding axis depending upon the number of individual rolls (lanes) that have been created from the full width of the bulk web. It is common for a bulk web to be longitudinally slit into 5 to 8 web portions to achieve the desired packaged roll size.

While the process as described is used in with an ultrasonic tail welding method, the apparatus and process may also be used with other methods to secure the tail to the wound roll (e.g., gluing) with similar benefits of enabling the tail tack to be positioned in close proximity to the tail. In practice, the apparatus and method can easily locate the tack within one-half inch of the tail. Using the ultrasonic tail welding process assures minimal engagement of multiple underlying wraps of the web material so that only the last wrap of the web material is forms a potentially unusable loop of material and does not introduce any additional compositions to the wound roll beyond the web material itself making it ideal for winding operations of webs for use in sterile environments or similar where strict material controls are necessary.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An apparatus for securing a tail end of a spirally wound roll of nonwoven, polymer-based web material comprising:
    an ultrasonic welding assembly having a converter operably connected to a tool to oscillate the tool along an oscillation axis; and a fixture configured to align the oscillation axis of the tool generally parallel to a tangent of the roll and to enable selective movement of the tool into tangential contact with the roll.

2. The apparatus of claim 1, further comprising a winding apparatus configured to form the spirally wound roll of web material about a winding axis, the spirally wound roll having a tail end on an outermost winding of the spirally wound roll.

3. The apparatus of claim 2, wherein the tool comprises an external surface having a high friction coefficient with the web material, the external surface configured to grip the outermost winding of the formed roll causing oscillating movement thereof.

4. The apparatus of claim 3, further comprising a control system configured to monitor and manage operation of the winding apparatus, the welding assembly, and the fixture enabling selective management of the location, number, and strength of the binding between the outermost winding and at least one underlying winding layer.

5. The apparatus of claim 4, wherein the fixture comprises a pressure sensor configured to monitor contact pressure between the tool and the wound roll, and the control system is further configured to manage the fixture in a manner to apply a predetermined pressure between the tool and the spirally wound roll.

6. The apparatus of claim 4, wherein the winding apparatus further comprises a break apparatus configured to sever the web material thereby creating the tail end, and the control system further comprises a position sensor configured to determine the rotational orientation of the tail end on the spirally wound roll on the winding apparatus and manage winding apparatus operation to orient the tail end at a predetermined position in relation to the tool.

7. The apparatus of claim 4, wherein the control system is configured to manage oscillation parameters of the tool.

8. The apparatus of claim 2, wherein the fixture further comprises a plurality of ultrasonic welding assembles spaced-apart along an axis parallel to the winding axis.

* * * * *